United States Patent
Kew et al.

(10) Patent No.: US 8,997,042 B2
(45) Date of Patent: Mar. 31, 2015

(54) FLEXIBLE AND RUN-TIME-MODIFIABLE INCLUSION OF FUNCTIONALITY IN COMPUTER CODE

(71) Applicant: Pivotal Software, Inc., Palo Alto, CA (US)

(72) Inventors: John Victor Kew, Seattle, WA (US); Jonathan Travis, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 54 days.

(21) Appl. No.: 13/652,351

(22) Filed: Oct. 15, 2012

(65) Prior Publication Data

US 2014/0109045 A1    Apr. 17, 2014

(51) Int. Cl.
*G06F 9/44*    (2006.01)
*G06F 9/45*    (2006.01)
*G06F 9/455*   (2006.01)

(52) U.S. Cl.
CPC ............... *G06F 8/315* (2013.01); *G06F 9/455* (2013.01); *G06F 8/311* (2013.01); *G06F 8/316* (2013.01); *G06F 9/4552* (2013.01)
USPC ............ 717/116; 717/118; 717/141; 717/150

(58) Field of Classification Search
CPC ....... G06F 8/315; G06F 8/316; G06F 9/4552; G06F 9/455
See application file for complete search history.

(56) References Cited

U.S. PATENT DOCUMENTS

| | | | | |
|---|---|---|---|---|
| 7,458,061 B2* | 11/2008 | Bracha | | 717/116 |
| 7,707,547 B2* | 4/2010 | Colton et al. | | 717/118 |
| 8,739,141 B2* | 5/2014 | Song et al. | | 717/150 |
| 2003/0221182 A1* | 11/2003 | Tip et al. | | 717/116 |
| 2004/0015917 A1* | 1/2004 | Click et al. | | 717/150 |
| 2004/0205738 A1* | 10/2004 | Yoshida et al. | | 717/150 |
| 2005/0050527 A1* | 3/2005 | McCrady et al. | | 717/141 |
| 2006/0248519 A1* | 11/2006 | Jaeger et al. | | 717/141 |
| 2008/0301635 A1* | 12/2008 | Khan | | 717/116 |
| 2008/0301636 A1* | 12/2008 | Khan | | 717/118 |
| 2009/0055806 A1* | 2/2009 | Tang | | 717/131 |
| 2009/0198496 A1* | 8/2009 | Denecke | | 704/257 |

(Continued)

OTHER PUBLICATIONS

Christoph Bockisch, A Flexible Architecutre for Pointcut-Advice Language Implementations, 2007, pp. 1-7.*

(Continued)

*Primary Examiner* — Thuy Dao
*Assistant Examiner* — Mongbao Nguyen
(74) *Attorney, Agent, or Firm* — Fish & Richardson P.C.

(57) ABSTRACT

The current application is directed to flexible and run-time-modifiable implementation of crosscutting functionalities, including code instrumentation, error logging, and other such crosscutting functionalities. These crosscutting functionalities generally violate, or run counter to, modern code-development strategies and programming-language features that seek to partition logic into hierarchically organized compartments and modules with related functionalities, attribute values, and other common features. One feature of the methods and systems for implementing crosscutting functionalities to which the current application is directed is an intelligent switch that can be controlled, at run time, to alter invocation and behavior of crosscutting-functionality implementations, including data-collection instrumentation, error logging, and other crosscutting-functionality implementations.

18 Claims, 14 Drawing Sheets

(56) References Cited

U.S. PATENT DOCUMENTS

| | | | |
|---|---|---|---|
| 2009/0249021 A1* | 10/2009 | Morris | 711/202 |
| 2009/0300138 A1* | 12/2009 | Schneider | 709/217 |
| 2010/0064276 A1* | 3/2010 | Lee et al. | 717/118 |
| 2010/0138815 A1* | 6/2010 | Schneider | 717/141 |
| 2010/0281471 A1* | 11/2010 | Liao et al. | 717/141 |
| 2011/0202564 A1* | 8/2011 | Kodaka et al. | 707/781 |
| 2011/0321009 A1* | 12/2011 | Shulmister, Jr. | 717/116 |

OTHER PUBLICATIONS

Erik Hilsdale, Advice Weaving in AspectJ, 2004, pp. 1-8.*

Tao Xie, A Framework and Tool Supports for Generating Test Inputs of AspectJ Programs, 2006, pp. 1-11.*

* cited by examiner

FLEXIBLE AND RUN-TIME-MODIFIABLE INCLUSION OF FUNCTIONALITY IN COMPUTER CODE

TECHNICAL FIELD

The current application is directed to design and implementation of control logic and computer programs and, in particular, to methods and systems for introducing crosscutting functionality into computer code that allow the crosscutting functionality to be adapted and modified before and during execution of the computer code.

BACKGROUND

Instrumentation of computer code has been used, for many years, during development, analysis, optimization, and debugging of various types of computer programs, including operating-system cod; virtual-machine code, various types of system routines and facilities, and application programs. By introducing instrumentation into computer code, various types of data can be collected from an executing system or program, including timing data, resource-utilization data, error-log data, and sequential or tree-like data representations of the code paths traversed by executing systems, programs, and routines.

Comprehensive instrumentation, unfortunately, does not well fit within many code-development paradigms. Many code-development strategies and programming-language features are directed to compartmentalizing functionality and logically organizing code into hierarchical modules, objects, and other constructs. In general, however, instrumentation and related tasks, including error logging and error handling, involve insertion of specialized functionality across objects, modules, and other such compartmentalized entities.

During the past decade, tools for facilitating code instrumentation and related tasks have been developed under the category of aspect-oriented programming ("AOP") tools and facilities. AOP provides tools for implementing crosscutting functionalities, such as instrumentation of code for analytics and logging errors, within the object-oriented-programming paradigm and other such development strategies. Crosscutting functionalities are functionalities that cut across the various code-development strategies and paradigms, such as object-oriented programming and earlier top-down programming that seek to logically organize code into functionality-related compartments and hierarchies. While AOP has addressed many of the problems associated with implementation of crosscutting tasks and facilities, certain challenges to implementing cross-cutting functionalities remain. For this reason, designers, developers, manufacturers and vendors, and, ultimately, users of a wide variety of different types of computer-instruction-encoded control components to modern computational systems, from processor-controlled appliances and cell phones to high-end distributed computational facilities, continue to seek additional tools and strategies for implementation of crosscutting functionalities, including code instrumentation.

SUMMARY

The current application is directed to flexible and run-time-modifiable implementation of crosscutting functionalities, including code instrumentation, error logging, and other such crosscutting functionalities. These crosscutting functionalities generally violate, or run counter to, modem code-development strategies and programming-language features that seek to partition logic into hierarchically organized compartments and modules with related functionalities, attribute values, and other common features. One feature of the methods and systems for implementing crosscutting functionalities to which the current application is directed is an intelligent switch that can be controlled, at run time, to alter invocation and behavior of crosscutting-functionality implementations, including data-collection instrumentation, error logging, and other crosscutting-functionality implementations.

DETAILED DESCRIPTION

It should be noted, at the onset, that the current application is directed to implemented functionalities, and systems containing implemented functionality, that are real, tangible, physical subcomponents of physical devices and systems. One frequently encounters statements made by those unfamiliar with modern science and technology with regard to the "abstract" nature of "software," whatever the non-technically and non-scientifically educated individuals mean by these terms. Those familiar with science and technology well understand that much of the control logic incorporated within modern devices, machines, and systems is implemented as large sets of processor instructions that are physically stored in memories, mass-storage devices, and removable storage media and that must necessarily be so physically embodied in order to be accessed by processors and other computer machinery for execution. Physically embodied processor instructions are no less physical, tangible, and real than power supplies, processors, component housings, electronic memories, internal and external communications hardware, and other such components of modern devices, machines, and systems.

Figure 1:
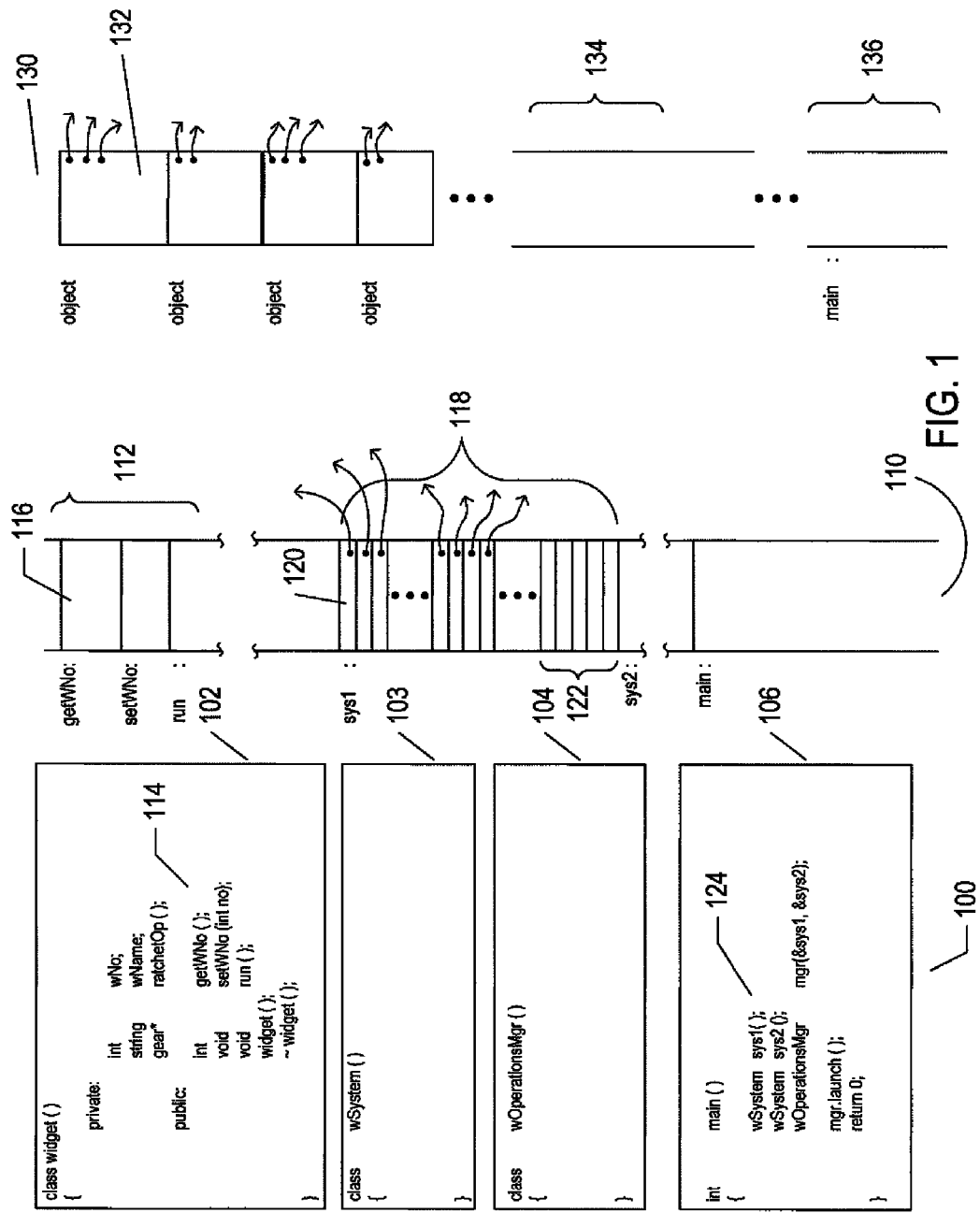
FIG. 1 illustrates a symbolically encoded computer program and a corresponding physical, in-memory implementation of the computer program.

FIG. 1 illustrates a symbolically encoded computer program and a corresponding physical, in-memory implementation of the computer program. A symbolically encoded computer program 100 may include a symbolic encoding of a number of different classes 102-104 and a main routine 106 that together specify a set of instructions that are stored in memory for execution by one or more processors within a processor-controlled device, machine, or system. In many modern programming environments, objects instantiated during execution of a computer program correspond to symbolically encoded classes. In FIG. 1, a virtual address space 110 composed, in general, of instruction-storage and data-storage faculties provided as physical address spaces both by one or more electronic memories and one or more non-volatile mass-storage devices, is shown as a column, according to conventional illustration techniques. The function members of classes are generally compiled into sets of sequentially organized processor instructions that reside in one portion of memory 112. For example, the function member "getWNo" 114 of the widget class 102 is compiled into a set of instructions represented by block 116 associated with a symbolic entry point or initial memory address. An object may be instantiated for a class by allocating and configuring a portion of the address space, such as address-space portion 118, to include references to entry points corresponding to member functions of the object as well as memory locations for object data members and/or references to object data members. For example, the instantiated object 118 is instantiated from the wSystem class 103 and contains references, such as reference 120, to entry points of function members of the object as well as storage locations 122 in memory for storing the values of object data members and references to data members located elsewhere in memory. This particular object, sys1, is instantiated in an initial line 124 of the main routine 106.

The in-memory implementation of the symbolically encoded program, shown in FIG. 1, is relatively simplistic. In actual devices, machines, and systems, the mappings from symbolic encodings of computer programs to a virtual address space that represents various different electronic memories and storage space within mass-storage devices may be complex. FIG. 1 also shows, in a right-hand column 130, a simplified representation of the in-memory implementation of the symbolically encoded computer program 100 as a set of in-memory resident object instantiations, such as object instantiation 132, a region of processor instructions corresponding to routines called from object instantiations 134, and processor instructions stored within memory that represent the main routine 136. The memory of a functioning processor-controlled device also includes large numbers of operating-system routines, library code, and many other types of control functionalities implemented as stored processor instructions that provide computational facilities and an execution environment for computer programs.

Figure 2:
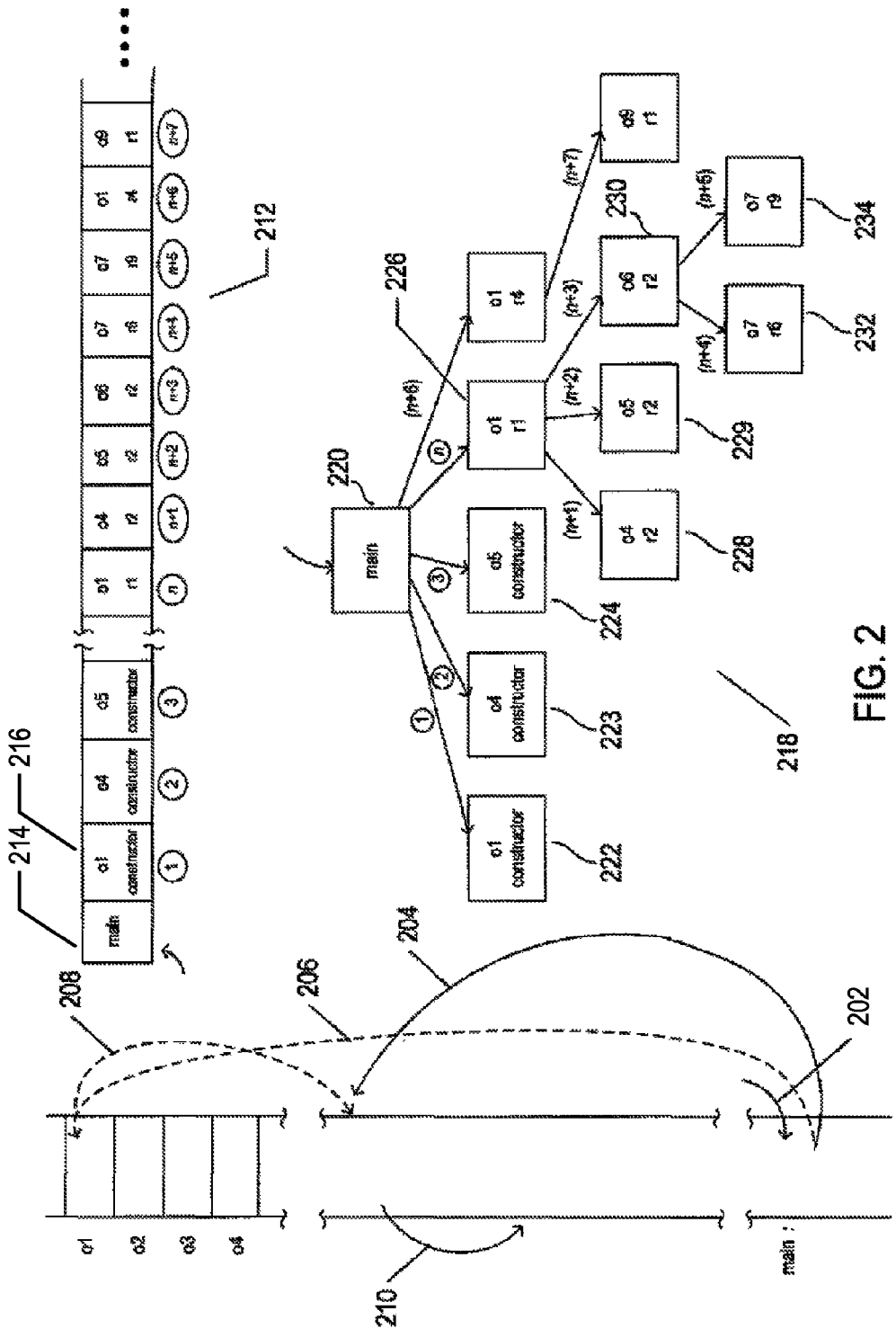
FIG. 2 illustrates program execution and collection of data via instrumentation.

FIG. 2 illustrates program execution and collection of data via instrumentation. When execution of a program is launched, the program generally begins execution at the first instruction of the main routine, as represented by arrow 202 in FIG. 2. As main instructions are sequentially executed, an instruction representing a call to a routine is generally encountered, with execution control passing to a portion of memory that contains instructions for the routine, as represented by arrow 204 in FIG. 2. When the routine is a member function of an instantiated object, the routine call involves accessing a virtual table for the object that contains function-member references, represented by dashed arrow 206 in FIG. 2, and following the reference to appropriate routine code, represented by dashed arrow 208 in FIG. 2. As the called routine begins to execute, the called routine often calls yet an additional routine, represented by arrow 210 in FIG. 2.

There are a variety of different types of instrumentation that may be included in an implementation of a symbolically encoded computer program. One type of instrumentation collects data at the beginning of execution and end of execution of each routine. The data collected from this type of instrumentation may form a sequence of data frames 212, each frame of the sequence representing one call to a routine. For example, in FIG. 2, a first frame 214 of the sequence corresponds to the initial call of the main routine and the next frame 216 of the sequence of data frames 212 corresponds to a call of a constructor member function associated with instantiated objected o1. Each data frame contains a variety of different types of information useful for subsequent analysis of program execution. A data frame may include time stamps, values of various machine-state variables, time-stamped indications of calls to system routines, and many other types of information that can be used, during analysis, to understand various aspects of program execution. For example, using a sequence of data frames produced by an executed program, an execution-analysis tool can determine the amount of time and/or number of processing cycles used by each routine in order to identify computationally expensive routines that might be good candidates for application of various optimization methods used to improve efficiency of execution of the program. Similarly, instrumentation may be included in the program to log errors that occur during execution of the program and to collect a myriad of different additional types of information may be used to understand and characterize the execution behavior of the computer program. Often, a sequence of data frames, such as the sequence of data frames 212 shown in FIG. 2, may be hierarchically organized for display 218. Levels of the hierarchy indicate the depth of nested routine calls during execution of the program. For example, the initially called main routine 220 may successively call constructors for a number of objects 222-224 and then call a routine "r1" of a first object 226 which calls various additional routines 228-230, one of which calls yet additional routines 232 and 234. Both the sequential organization of data frames and hierarchically organized data frames generated from data collected by instrumentation, referred to as execution traces," are familiar to computer scientists and engineers.

Initially, program developers would include explicit calls to instrumentation routines within program routines in order to instrument the program routines. For many reasons, this practice runs counter to modem computer-code-development strategies. Insertion of instrumentation is time consuming, expensive, and error prone, and altering behavior of instrumentation code may involve many different changes and general recompilation of program code. For example, it may be the case that, rather than saving a complete list of data frames generated by each routine called during execution of a program, which, for even a modestly sized program, may run into millions, tens of millions, or more data frames, an analyst may instead wish to either randomly generate a sparse set of data frames, to decrease the amount of data storage necessary but to still provide a sufficient amount of information about the execution of a program for analysis purposes, or may instead wish to aggregate the data frames during data collection. As one example, it may be the case that the analyst is not concerned with collecting individual information for lower-level routines within a trace hierarchy, but instead prefers to aggregate elapsed time, processing cycles, and other characteristics of the lower-level frames into higher-level frames. For example, referring to FIG. 2, instead of storing frames 226, 230, 232, and 234 generated as a result of the call by the main program to the routine "r1" of a first instantiated object, the analyst may prefer to aggregate all of the information contained in these four nodes in a single node 226 corresponding to the routine call. Modifying instrumentation included in each routine in order to accomplish such goals involves time-consuming, expensive, and potentially error-prone programming.

Figure 3:
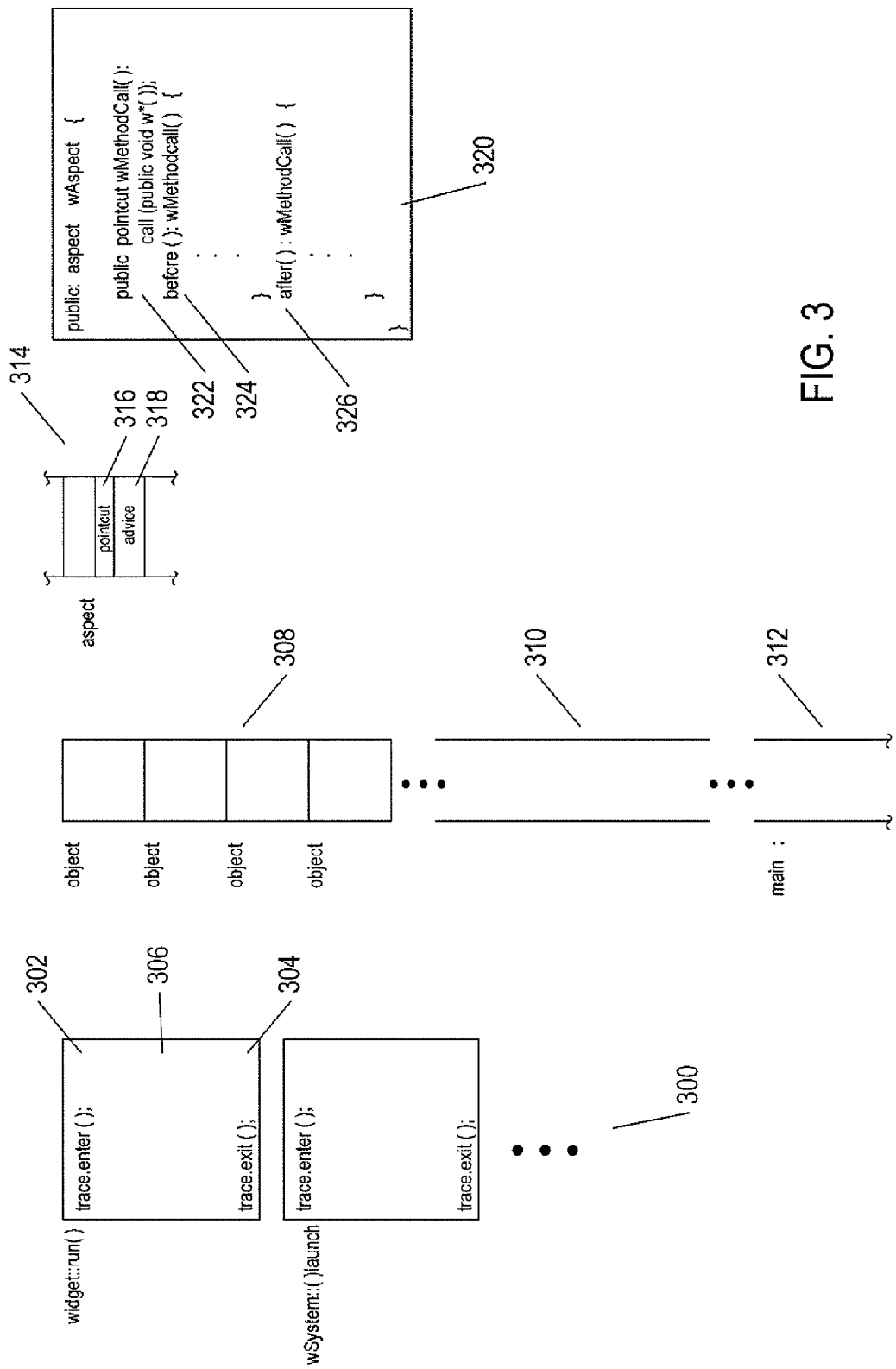
FIG. 3 illustrates the aspect-oriented-programming ("AOP") approach to implementing crosscutting functionality.

FIG. 3 illustrates the aspect-oriented-programming ("AOP") approach to implementing crosscutting functionality. In the left column of FIG. 3 300, the manual instrumentation of routines is illustrated. In this case, in order to generate a trace of data frames, as discussed above with reference to FIG. 2, a program developer has introduced routine calls to a trace object at the beginning 302 and end 304 of each routine, such as routine 306. As discussed above, this technique is expensive in time, error-prone, relatively inflexible, and contrary to modern program-development strategies, including object-oriented programming.

During the past decade, AOP techniques and facilities have been developed. In one AOP approach, in addition to object instantiations 308, routines 310, and a main program 312, an in-memory implementation of the program may additionally include one or more aspects 314, each aspect including a pointcut definition 316 and executable code 318 that is inserted at those points during program execution identified by the pointcut, referred to as "advice." FIG. 3 shows a symbolic encoding of a simple aspect 320, in which the pointcut definition 322 identifies various routines into which advice should be inserted and the "before" and "after" routines 324 and 326 specify advice code to be executed prior to and following execution of the routines identified by the pointcut during program execution. Of course, there are many different programming-language syntaxes and facilities that can be used to define aspects, the example shown in FIG. 3 is intended only to illustrate the fact that aspects can be symbolically encoded, rather than provide an example of how the encoding is carried out. Aspects thus provide an elegant tool for introducing crosscutting facilities into a computer program. Rather than introducing routine calls in each routine, as in the symbolic code 300 shown on the left side of FIG. 3, a programmer need only develop an appropriate aspect for the program, and the desired crosscutting functionality is automatically included during program execution. As discussed further, below, the aspect may be initially compiled to bytecode, and advice then inserted into executable code during final interpretation and/or compilation of bytecode by a virtual machine, in certain systems.

Figure 4:
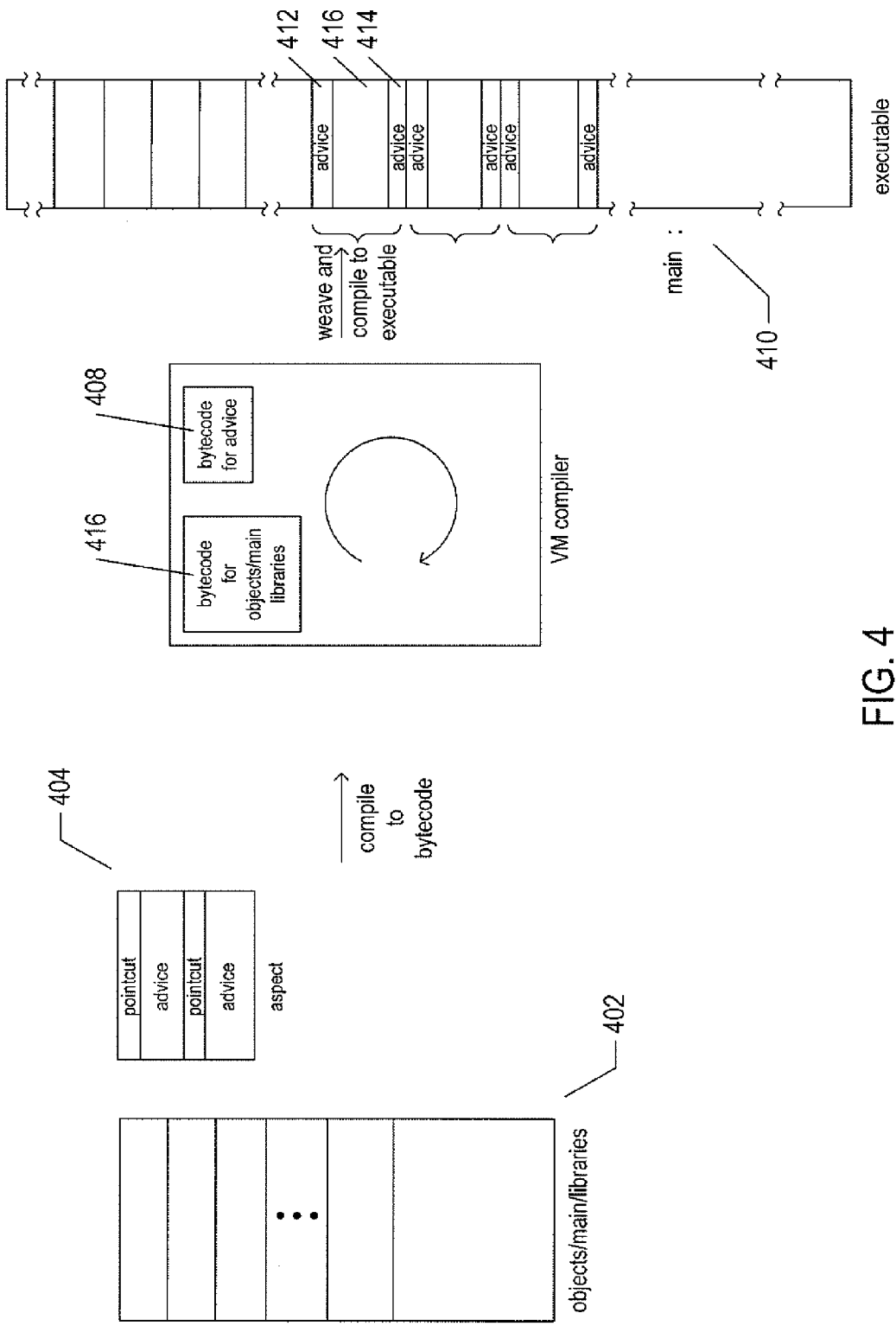
FIG. 4 illustrates one method by which AOP-defined instrumentation is included during program execution.

FIG. 4 illustrates one method by which AOP-defined instrumentation is included during program execution. In certain modern programming languages, such as Java, symbolically encoded program code is initially compiled to intermediate byte code, also referred to as "byte code" and "intermediate code," which is then interpreted and/or compiled by a virtual machine into executable code for execution on particular devices, machines, and systems. As shown in FIG. 4, a program, including class declarations and implementations and a main program, in addition to various libraries and system code 402 and an aspect 404, which includes one or more pointcuts and associated advice, are separately compiled into byte code for the program 406 and byte code for the aspect advice 408. A virtual machine then generates, from these two sets of byte code, an executable 410 or portions of executable code stored in an address space. The process by which the program byte code and aspect byte code is merged is referred to as "weaving." In the case of an aspect that includes pointcuts that identify points in time, during execution, corresponding to the entering of routines and exiting from routines, a virtual machine introduces the advice corresponding to the pointcuts into the code for those routines selected by the pointcuts, during executable-code generation. For example, as shown in FIG. 4, advice to be executed prior to and following execution of particular routines has been introduced by the virtual machine at the beginning 412 and at the end 414 of particular routines, such as routine 416. It may alternatively be possible to combine intermediate program code and aspect program code and then interpret or compile the combined program and aspect intermediate code.

Pointcuts can be used to identify any of various different subsets of points in the execution of a program, referred to as "joinpoints." Joinpoints may include any type of point during the execution of a program that may be defined, including the beginning of execution of routines, immediately following execution of routines, access to particular memory locations, and other such definable points that may arise during the execution of a routine. For example, considering the joinpoints corresponding to the beginning of execution of all routines, which can be defined as points at which routine-call instructions are executed, a pointcut may be used to define a subset of these joinpoints comprising the points in the execution of the program corresponding to routine-call instructions for only a subset of the routines of the program, such as the member functions of a particular class or instantiated object. Thus, aspect definition is quite general, and allows for introduction of functionality at arbitrarily selected defined points during the execution of a program. In the following examples, collection of data frames for trace analysis, as discussed above with reference to FIG. 2, is implemented using an aspect, such as aspect 320 discussed with reference to FIG. 3, which results in introduction of executable trace code immediately prior to and immediately following execution of each of a definable set of routines. However, techniques similar to those discussed below can be used for code inserted at other types of joinpoints.

Figure 5A:
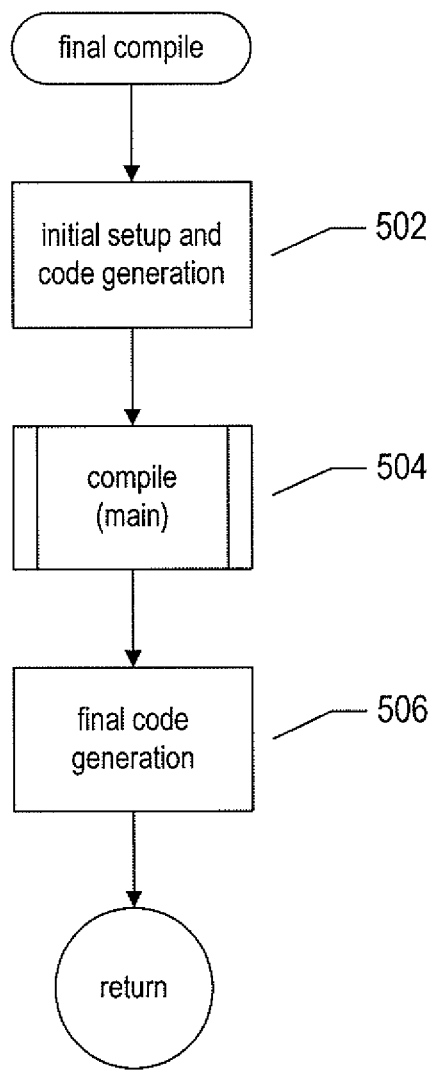
FIGS. 5A-B illustrate the final interpretation or compilation of program byte code and aspect byte code by a virtual machine in a weaving process.
Figure 5B:
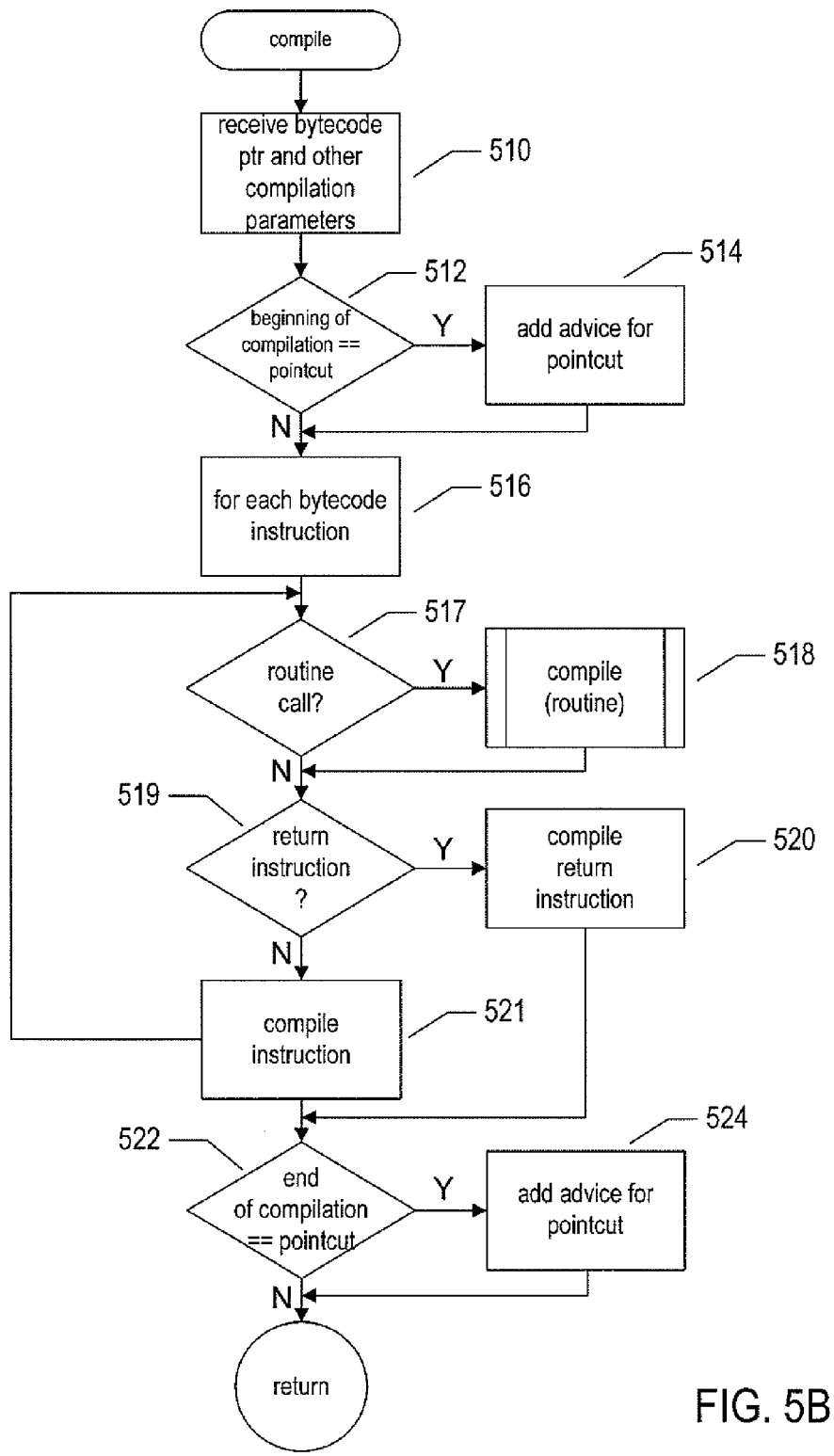

FIGS. 5A-B illustrate the final interpretation or compilation of program byte code and aspect byte code by a virtual machine in a weaving process. In this discussion, the phrase "final compile" and the term "compile" is used to mean either byte code interpretation, compilation of byte code into machine instructions, or, as is often the case, a combination of interpretation and compilation that produces executable code that is executed by underlying computer hardware following generation of the executable code by a virtual machine to which the program byte code and aspect byte code is furnished. FIG. 5A shows a routine "final compile." In a first step 502 of this routine, program and aspect byte code corresponding to a program is received by a virtual machine that carries out any initial setup tasks and initial code generation that precedes generation of executable code corresponding to a program. Then, in step 504, the routine "final compile" calls a routine "compile" to begin generating executable code for the main routine of the program and for routines called from the main routine. Finally, in step 506, the virtual machine carries out any additional code generation and other tasks needed to provide executable code to underlying hardware corresponding to the initially received program and aspect byte code.

FIG. 5B provides a control-flow diagram for the routine "compile" called in step 504 of FIG. 5A. In step 510, the routine "compile" receives a byte code pointer to the beginning of a routine to compile and any other various compilation parameters. In step 512, the routine "compile" determines whether the current execution point corresponding to the beginning of compilation of a routine corresponds to a point of execution defined by a pointcut within the aspect byte code. When the current point of execution corresponds to a pointcut, any advice corresponding to that pointcut is appended to the byte code for the routine, in step 514. Next, in the for-loop of steps 516-521, the routine "compile" compiles each byte code instruction into executable code. When the instruction is a routine call, as determined in step 517, the routine "compile" is recursively called in step 518. When the next instruction is a return instruction, terminating the routine for which code is currently being generated, code for the return instruction is generated in step 520, terminating the for-loop of steps 516-521. Following generation of code for the return, the routine "compile" determines whether the current point of execution, following execution of the routine, corresponds to a point of execution defined by a pointcut in the aspect, in step 522. When the current point of execution corresponds to a pointcut, code is generated for the advice corresponding to that pointcut in step 524.

The system illustrated in FIG. 4 and code generation discussed with reference to FIG. 5A-B is, of course, greatly simplified for the sake of clarity in illustration and brevity of description. There are many different types of AOP implementations and many different types of computer programs and code-generation methods for computer programs. The discussion with reference to FIGS. 4-5B is intended to provide a conceptual context to facilitate disclosure of methods and systems for flexible and run-time-adjustable implementation of crosscutting facilities, including code instrumentation. While the AOP functionalities, discussed above, provide an elegant and easy-to-use facility for introducing instrumentation and other crosscutting executable code into a program, the code introduced via AOP methods and facilities is, nonetheless, relatively static and inflexible, from a run-time perspective. For example, consider again a hierarchical representation of a trace, such as representation 218 shown in FIG. 2. Developers may initially wish to collect fine-granularity data with respect to program execution and may therefore use pointcuts to define entry points into, and exit points from, a very large set of routines in order to obtain a detailed trace. Later, however, analysts may wish to consolidate nodes of a hierarchical trace, as discussed above, in order to save memory or to facilitate a higher-level view of program execution. At other points in time, analysts may wish to discontinue the collection of trace data all together. In order to adjust data collection in this fashion, using the AOP methods and facilities, one or more pointcuts within one or more aspects would need to be recoded, recompiled, and then rewoven into executable code as discussed above with reference to FIGS. 4-5B. The current application is directed to a more flexible approach that provides for run-time modification of aspect-defined code inserted into a program as well as code inserted through similar, non-AOP approaches.

Figure 6:
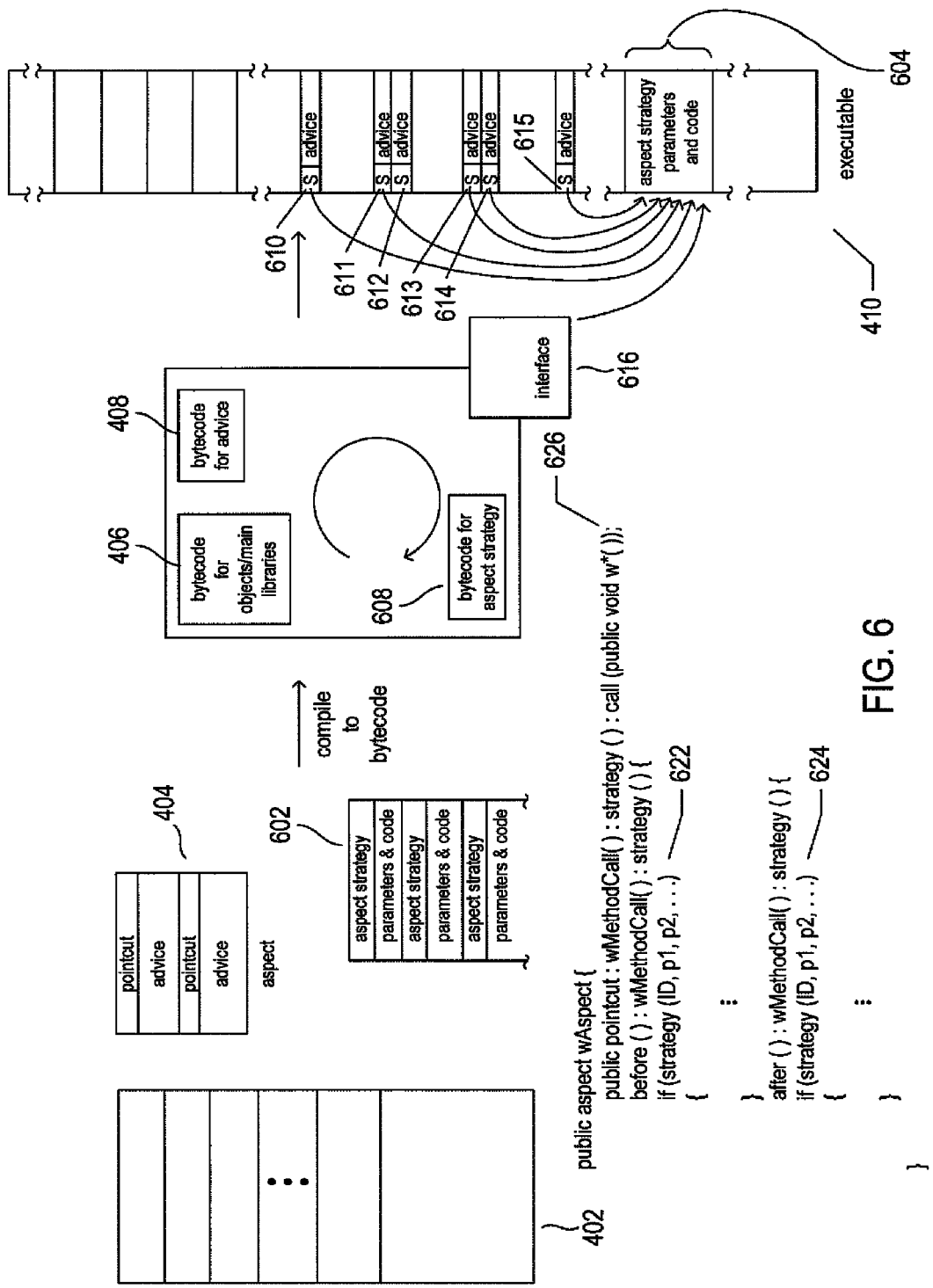
FIG. 6 illustrates the flexible and run-time-modifiable code-insertion methods that provide examples of the flexible and run-time-modifiable crosscutting-facility implementations disclosed in the current application.

FIG. 6 illustrates the flexible and run-time-modifiable code-insertion 20 methods that provide examples of the flexible and run-time-modifiable crosscutting facility implementations disclosed in the current application. FIG. 6 is similar to FIG. 4, discussed above, and uses the same illustration conventions. However, in addition to the program 402 and aspect 404 that are initially compiled to produce corresponding byte code 406 and 408, the currently described methods and facilities employ an additional set of aspect-strategy definitions 602 for which data-storage space and code is generated by the virtual machine during the final code generation to produce implemented aspect-strategy parameters and advice-switch code 604. In addition, the virtual machine provides an interface 616, or a separate interface is provided in addition to the virtual machine, to allow advice-strategy parameters to be modified, in real time, during code execution. Thus, the virtual machine employs the byte code for the program 406, byte code for the aspect 408, and byte code generated for advice strategies 608 to produce the executable code 410 corresponding to the program. The advice strategies define insertion of advice-switching code 610-615, or advice switches, into the executable advice code by the virtual machine interpreter and/or compiler. In one example an advice switch is in-line code or a reference to a general aspect-strategy routine or a particular advice-switch routine called to provide a Boolean value to a conditional statement during the initial execution of particular advice code to determine whether or not the remaining advice code should be executed. The general aspect-strategy routine or advice-switch routine may receive parameters passed from the advice code and may also access aspect-strategy parameters stored in memory 604 that contain data that persists during execution of the program. FIG. 6 provides a brief example of an aspect 620 that illustrates inclusion of advice switches 622 and 624 within advice associated with a pointcut 626. The advice switches are if statements that each calls a general aspect-strategy routine" strategy" that, in turn, calls a particular advice-switch routine identified the ID and, in certain cases, by the values of one or more additional parameters. In other implementations, the particular advice-switch routine may be directly called from advice code. In yet other implementations, each of many different aspect strategies may be associated with a general routine that uses passed-in information to select particular advice-switch routines.

The advice switches that are included in the code generated for advice provide for conditional execution of inserted advice code. Whether or not advice code is executed may depend on the values of aspect-strategy parameters associated with particular aspect strategies. In one implementation, each different aspect strategy is associated with one or more identifiers, or IDs, and an ID is passed to a general aspect-strategy object which identifies a particular advice-switch routine to execute, at run time, as an advice switch that controls particular advice. As one simple example, an advice switch may access an aspect-strategy parameter that holds a Boolean value. The advice switch controls whether or not the following advice code is executed depending on the value currently residing in the aspect-strategy parameter. An analyst may alter that aspect-strategy parameter value through an interface 616 at run time, allowing the analyst to control advice execution while a program is executing. For example, when the advice implements collection of data frames corresponding to routine calls, the analyst may use the interface to begin data collection at a point in time that the analyst discovers unexpected or aberrant program execution, thus allowing the analyst to avoid collecting large amounts of initial data not related to the aberrant program execution. Note that many different aspect strategies may be defined and associated with different sets of pointcuts, thus allowing a developer to associate different switching behaviors with the different sets of pointcuts.

Figure 7A:
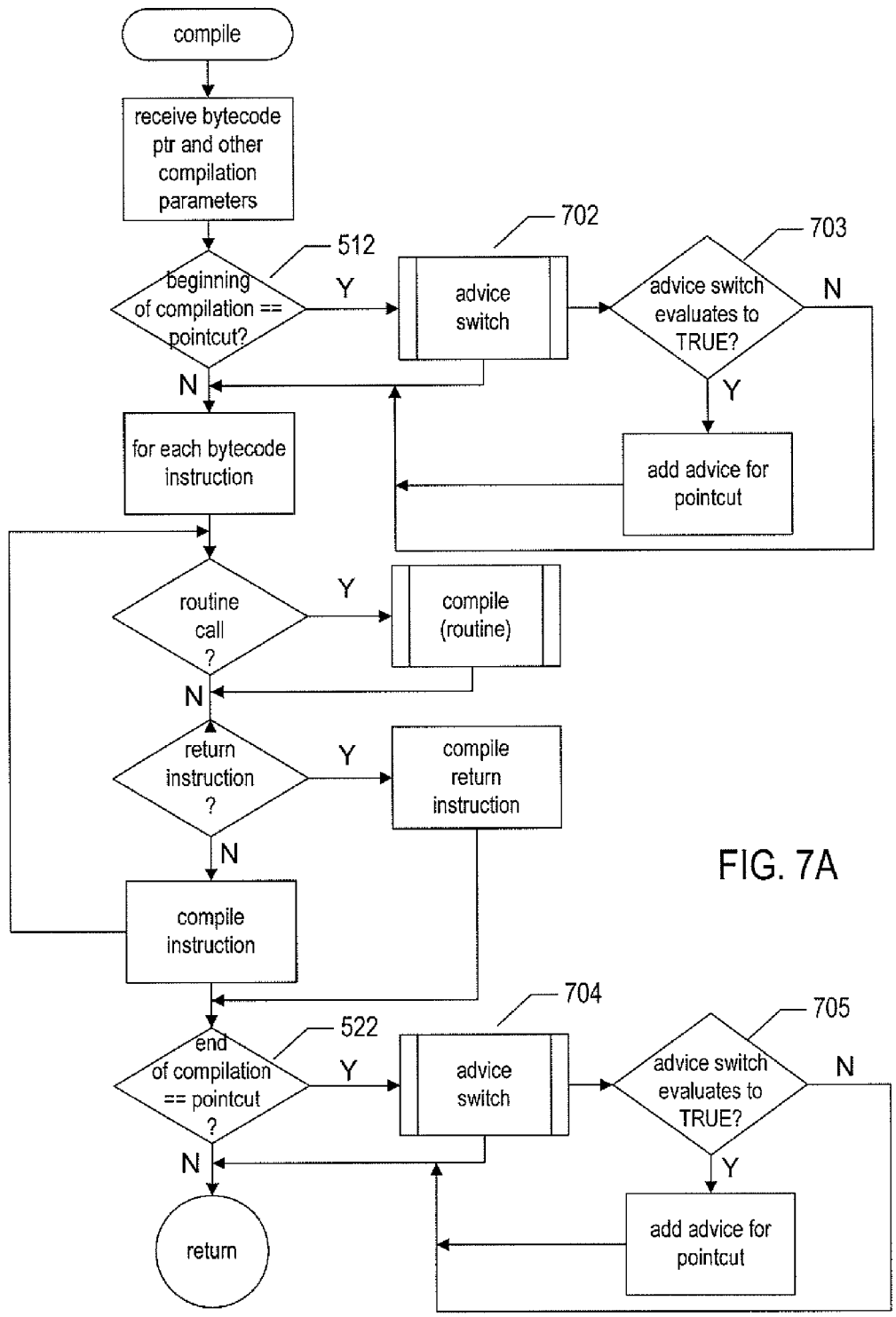
FIG. 7A illustrates the compile routine, previously illustrated in FIG. 5B, that includes calls to aspect-strategy routines that implement advice switches.

FIG. 7A illustrates the compile routine, previously illustrated in FIG. 5B, that includes calls to aspect-strategy routines that implement advice switches. Many of the steps shown in FIG. 7A are identical to those shown in FIG. 5B, and are therefore not again described. New steps include steps 702-703 and steps 704-705. Previously, in FIG. 5B, when it is determined that a point in execution corresponds to a point in execution defined by a pointcut, in steps 512 and 522, the advice corresponding to the pointcut is automatically added to generated code, as in steps 514 and 524. Now, however, when aspect strategies are included, following determination, in steps 512 and 522, that a point of execution has been reached that is defined by a pointcut, the routine "compile" calls an advice-switch routine, in steps 702 and 704, and then evaluates the Boolean value returned by the advice-switch return, in steps 703 and 705, to determine whether or not to add and/or execute code corresponding to the pointcuts. In the case the final code is produced by interpretation, any change in parameter values associated with an advice switch generally immediately results in alteration of execution behavior. In the case that the final code is generated by compilation, the change of an aspect-strategy parameter value may only be observed when cached executable code is deleted and new code generated. In certain implementations, advice switches may include additional routines for deleting cached executable code or marking cached executable code for deletion and recompilation.

Figure 7B:
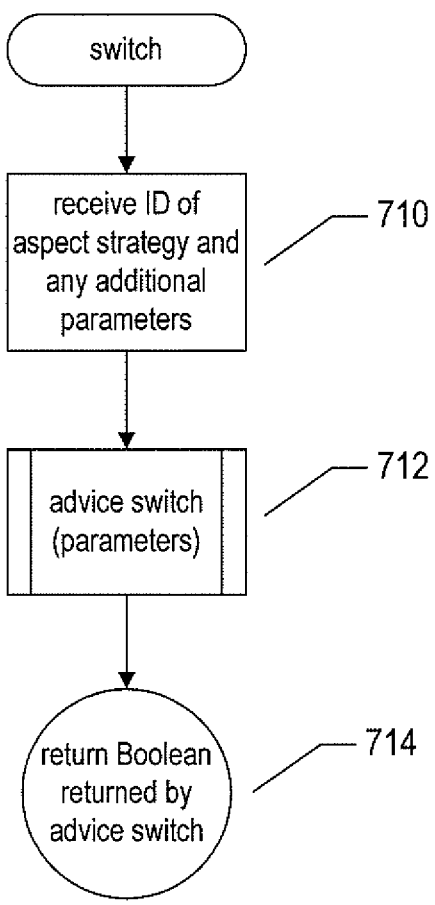
FIG. 7B provides a control-flow diagram for a general strategy routine that invokes a particular strategy switch based on strategy ID.

FIG. 7B provides a control-flow diagram for a general aspect-strategy switch routine that invokes a particular advice-switch routine based on an aspect-strategy ID and, in certain cases, values of one or more additional parameters. In step 710, the general aspect-strategy switch routine receives an aspect-strategy ID and any additional parameters passed to the general aspect-strategy switch routine from advice executable code and uses certain of this information to identify a particular advice-switch routine. Then, in step 712, the general aspect-strategy switch routine calls the particular identified advice-switch routine, in certain cases passing to the routine some or all of the additional received parameters, and returns a Boolean value returned by the particular advice-switch routine in step 714.

Figure 7C:
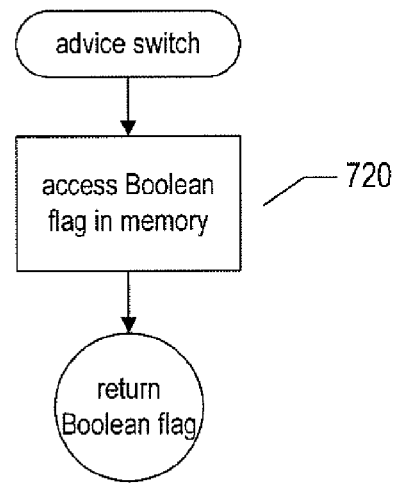
FIGS. 7C-E illustrate example advice-switch routines.
Figure 7D:
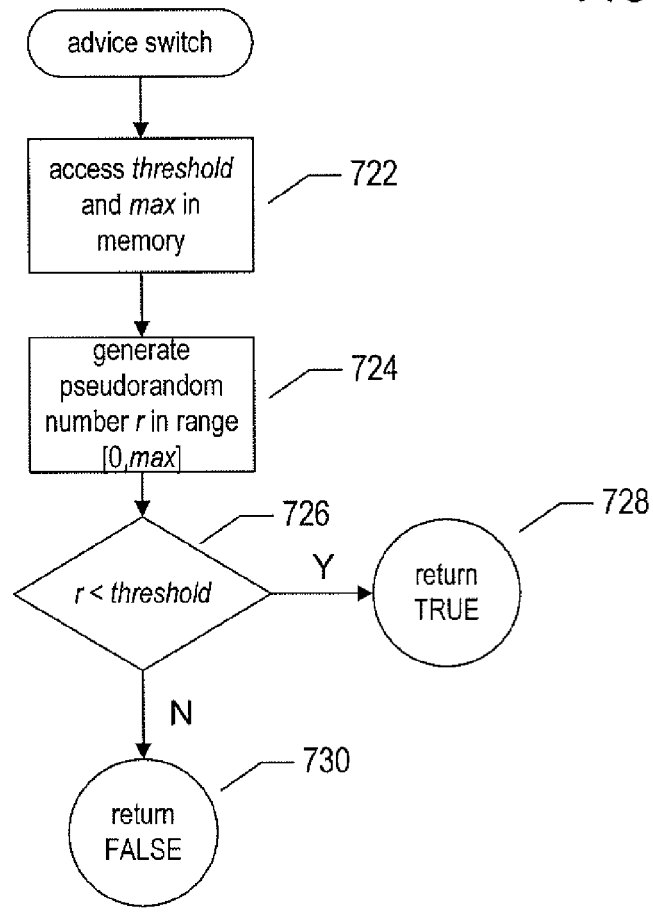
Figure 7E:
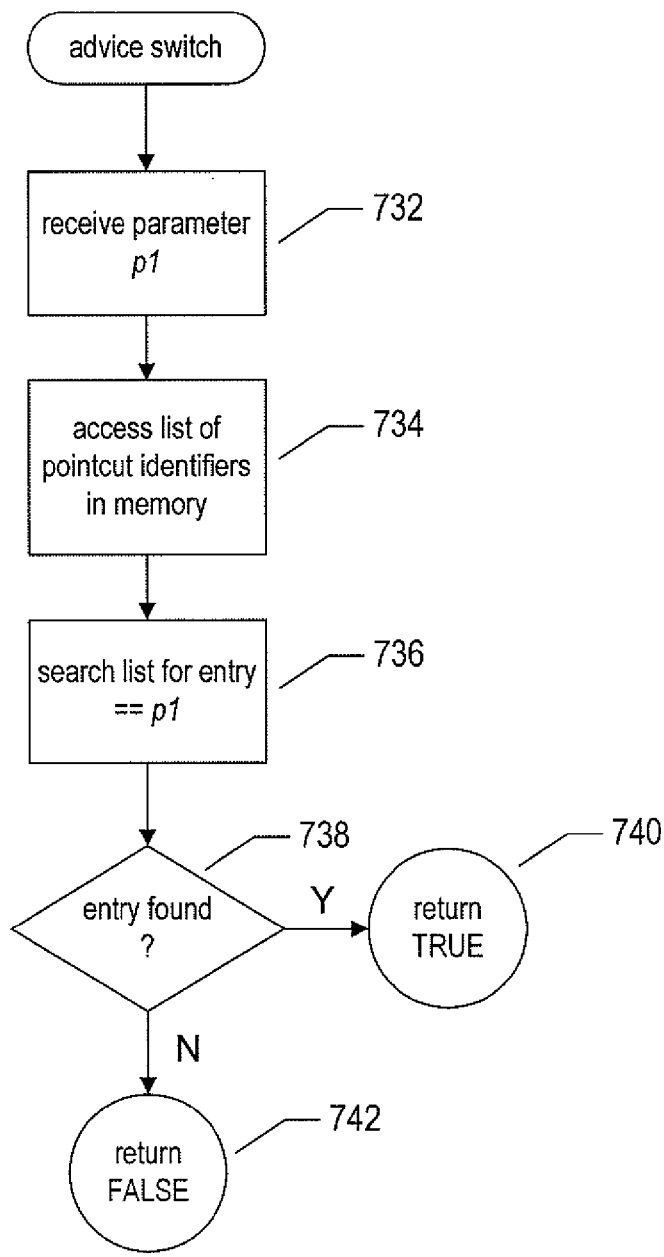

FIGS. 7C-E illustrate example advice-switch routines. FIG. 7C illustrates a simple advice-switch routine that accesses a Boolean flag stored in memory in an aspect-strategy parameter associated with the particular advice-switch routine and, in step 720, returns the value of the access Boolean flag. This type of advice-switch routine therefore provides binary on/off control of advice included in the executable code. FIG. 7D provides a control-flow diagram for a slightly more complex advice-switch routine. In this case, in step 722, the advice-switch routine accesses a threshold value and a max value stored in memory and associated with the advice-switch routine. In step 724, the advice-switch routine generates a pseudorandom number r in the range [0, max]. When r is less than the threshold value, as determined in step 726, the advice-switch routine returns TRUE, in step 728, and otherwise returns FALSE 730. This advice-switch routine may be used, as one example, to randomly collect only a certain percentage of the data frames that would otherwise be generated during comprehensive tracing. By adjusting the value of threshold and max parameters, in real time, an analyst may control, with fine granularity, the amount of trace data that is collected at different times during execution of a program. FIG. 7E illustrates a different type of advice-switch routine. In this advice-switch routine, a parameter p1 is received, in step 732, from the advice code in which the advice-switch routine is called. In step 734, the advice-switch routine accesses a list of pointcut identifiers stored in memory and associated with the advice-switch routine. In step 736, the advice-switch routine searches the accessed list for an entry that equals the value of the parameter p1 received in step 7322. When a matching entry is found, as determined in step 738, the value TRUE is returned in step 740, and otherwise the value FALSE is returned in step 742. This type of advice-switch routine may be used for real-time control of the execution of advice corresponding to subsets of pointcuts. A list of pointcuts for which advice should be currently executed may be stored and edited, through interface 616, in order to enable and disable various pointcuts curing execution of a program.

There is a large number of different possible types of advice-switch routines that may be devised in order to provide many types of flexible control over advice execution. This flexible control may be exercised prior to program execution as well as during program execution, by altering the values of strategy-switch-associated parameters through an interface such as interface 616 discussed above with reference to FIG. 6. Aspect strategies and aspect-strategy-associated parameters provide yet an additional dimension to code insertion implemented using AOP facilities. By using aspect strategies and aspect-strategy-associated parameters, execution of the advice associated with pointcuts may be controlled according to a variety of different parameter-encoded and programmed considerations. In addition, aspect-strategy and aspect-strategy-associated parameters may be employed by various other non-AOP instrumentation methods to control automatic insertion of code into executing programs. An advice switch may use parameters passed to the advice switch from advice code as well as aspect-strategy-associated parameters in order to produce a Boolean value to control execution of advice code. In alternative implementations, other types of advice switch encodings, rather than conditional statements that call routines that return a Boolean value, may used to control whether or not advice code is executed, including use of other types of language features to allow or prevent execution of advice code.

Next, a general description of computer hardware and software is provided, as an example of the types of systems to which the currently disclosed methods and systems may be applied. It should be emphasized that these examples are not comprehensive and are not intended to define target systems and subsystems for application of the currently disclosed methods. Instead, they provide examples of computer hardware, operating systems, and virtual machines.

Figure 8:
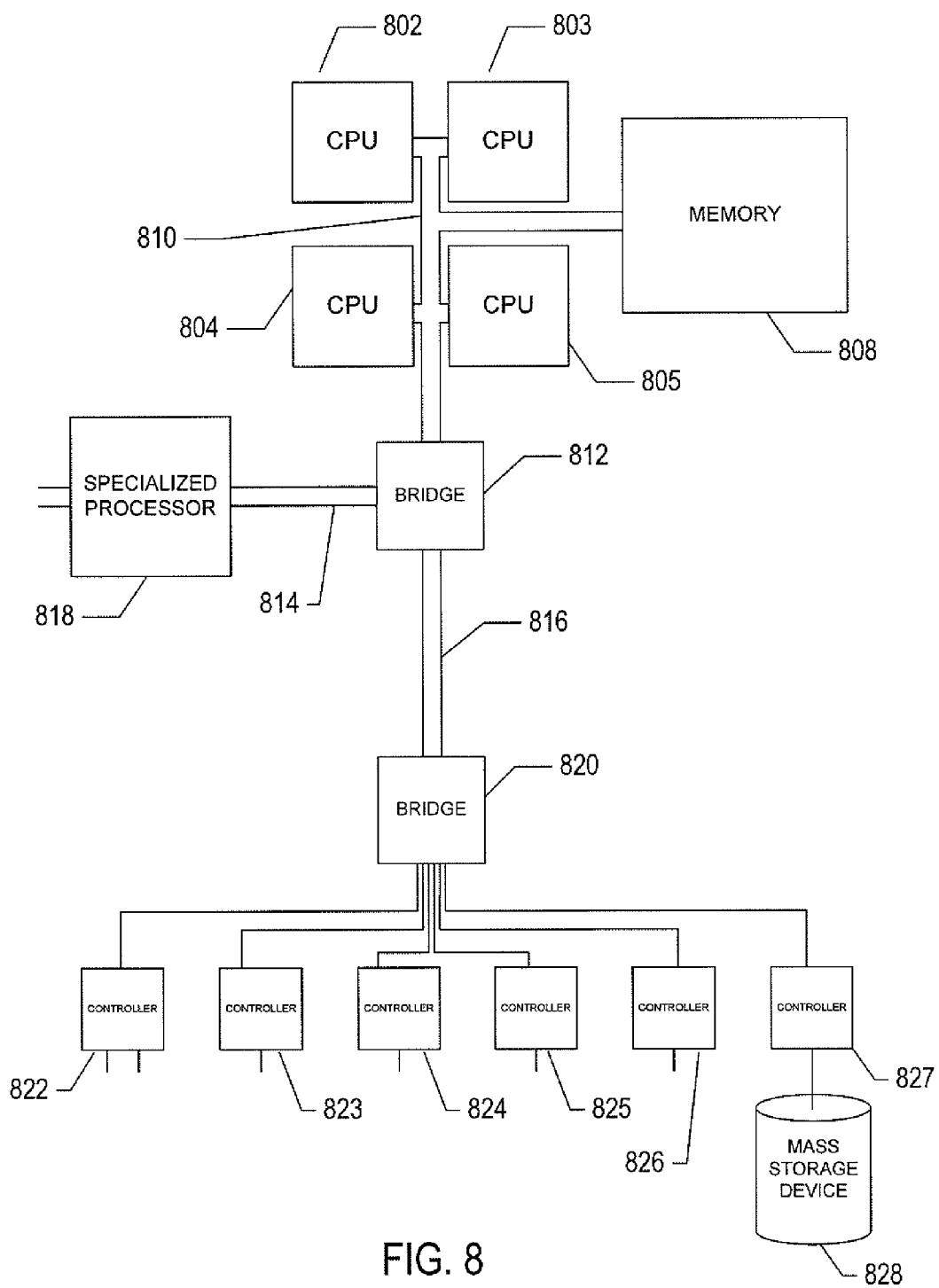
FIG. 8 provides a general architectural diagram for various types of computers.

FIG. 8 provides a general architectural diagram for various types of computers. The computer system contains one or multiple central processing units ("CPUs") 802-805, one or more electronic memories 808 interconnected with the CPUs by a CPU/memory-subsystem bus 810 or multiple busses, a first bridge 812 that interconnects the CPU/memory-subsystem bus 810 with additional busses 814 and 816, or other types of high-speed interconnection media, including multiple, high-speed serial interconnects. These busses or serial interconnections, in turn, connect the CPUs and memory with specialized processors, such as a graphics processor 818, and with one or more additional bridges 820, which are interconnected with high-speed serial links or with multiple controllers 822-827, such as controller 827, that provide access to various different types of mass-storage devices 828, electronic displays, input devices, and other such components, subcomponents, and computational resources.

Figure 9:
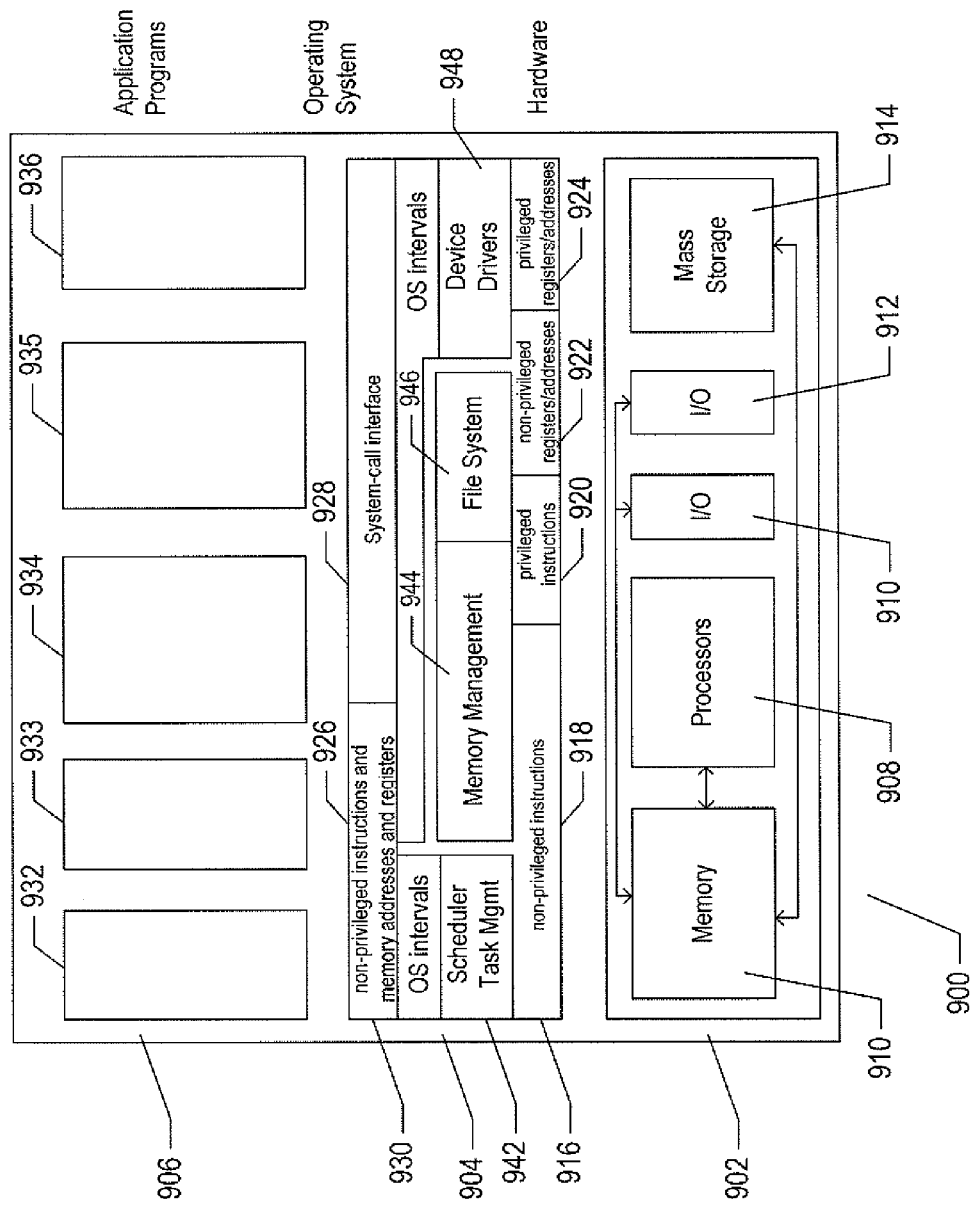
FIG. 9 illustrates generalized hardware and software components of a general-purpose computer system, such as a general-purpose computer system having an architecture similar to that shown in FIG. 8.

FIG. 9 illustrates generalized hardware and software components of a general-purpose computer system, such as a general-purpose computer system having an architecture similar to that shown in FIG. 8. The computer system 900 is often considered to include three fundamental layers: (1) a hardware layer or level 902; (2) an operating-system layer or level 904; and (3) an application-program layer or level 906. The hardware layer 902 includes one or more processors 908, system memory 910, various different types of input-output ("I/O") devices 910 and 912, and mass-storage devices 914. Of course, the hardware level also includes many other components, including power supplies, internal communications links and busses, specialized integrated circuits, many different types of processor-controlled or microprocessor-controlled peripheral devices and controllers, and many other components. The operating system 904 interfaces to the hardware level 902 through a low-level operating system and hardware interface 916 generally comprising a set of non-privileged processor instructions 918, a set of privileged processor instructions 920, a set of non-privileged registers and memory addresses 922, and a set of privileged registers and memory addresses 924. In general, the operating system exposes non-privileged instructions, non-privileged registers, and non-privileged memory addresses 926 and a system-call interface 928 as an operating-system interface 930 to application programs 932-936 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 942, memory management 944, a file system 946, device drivers 948, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 936 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices miming different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 10:
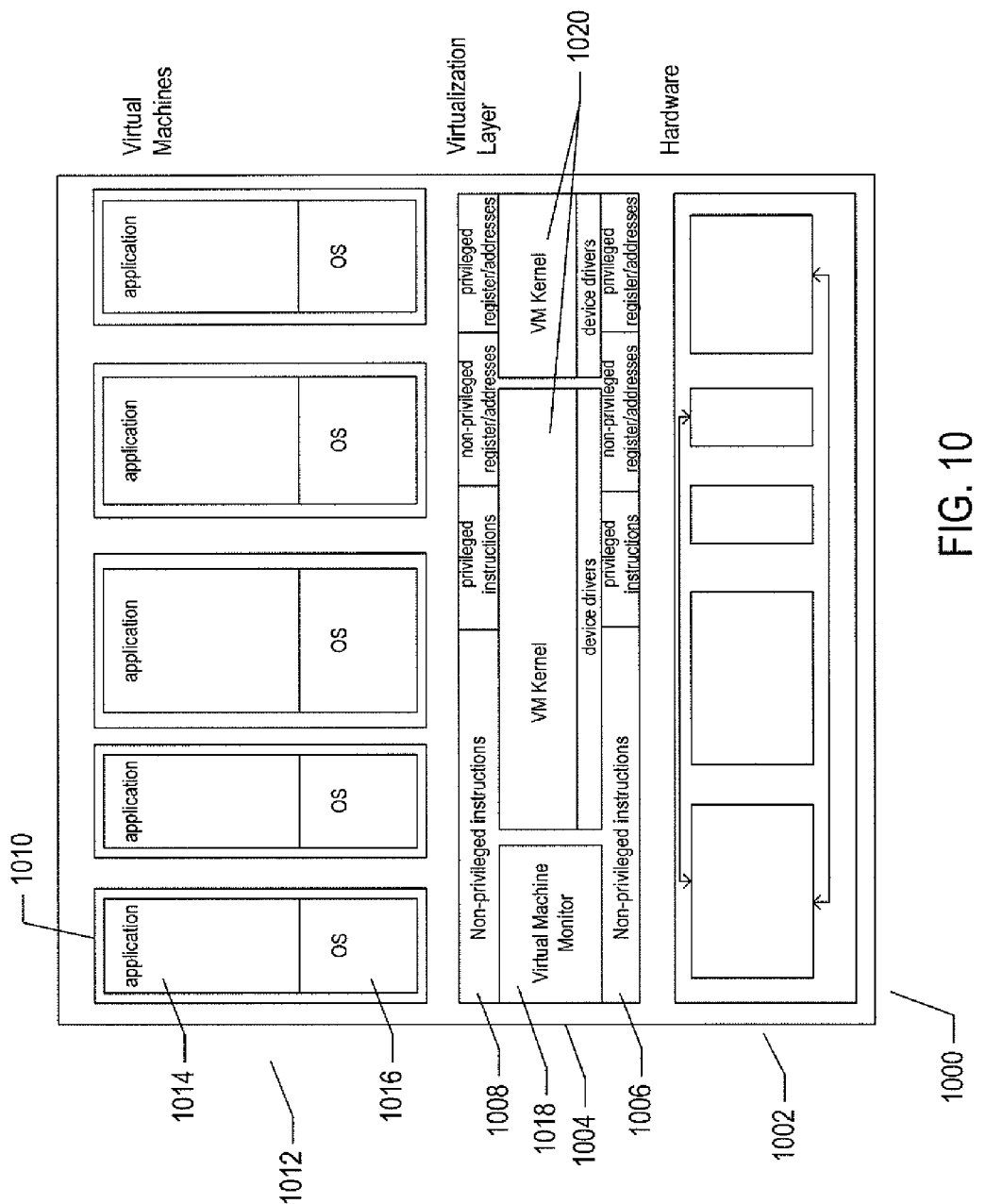
FIG. 10 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 10 illustrates one type of virtual machine and virtual-machine execution environment. FIG. 10 uses the same illustration conventions as used in FIG. 9. In particular, the computer system 1000 in FIG. 10 includes the same hardware layer 1002 as the hardware layer 902 shown in FIG. 9. However, rather than providing an operating system layer directly above the hardware layer, as in FIG. 9, the virtualized computing environment illustrated in FIG. 10 features a virtualization layer 1004 that interfaces through a virtualization-layer/hardware-layer interface 1006, equivalent to interface 916 in FIG. 9, to the hardware. The virtualization layer provides a hardware-like interface 1008 to a number of virtual machines, such as virtual machine 1010, executing above the virtualization layer in a virtual-machine layer 1012. Each virtual machine includes one or more application programs or other higher-level computational entities packaged together with an operating system, such as application 1014 and operating system 1016 packaged together within virtual machine 1010. Each virtual machine is thus equivalent to the operating-system layer 904 and application-program layer 906 in the general-purpose computer system shown in FIG. 9. Each operating system within a virtual machine interfaces to the virtualization-layer interface 1008 rather than to the actual hardware interface 1006. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 1008 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 1018 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 1008, the accesses result in execution of virtualization-layer code to simulate or emulate the privileged resources. The virtualization layer additionally includes a kernel module 1020 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Although the present invention has been described in terms of particular embodiments, it is not intended that the invention be limited to these embodiments. Modifications within the spirit of the invention will be apparent to those skilled in the art. For example, aspect strategies and aspect-strategy-associated parameters may be implemented in many different ways by varying any of many different design and implementation parameters, including programming language, underlying operating system, choice of virtual-machine technology, modular organization, data structures, control structures, language syntax, and other such parameters. Aspect strategies and aspect-strategy-associated parameters may be used to control execution of code insertion by any of many different types of AOP facilities as well as non-AOP code-insertion facilities. Aspect strategies and aspect-strategy-associated parameters may be used to control, as examples, data collection for traces, various types of logging, and other types of code insertion both prior to execution of programs and during execution of programs. Aspect strategies and advice switches may be introduced into aspects by various aspect-language features or may alternatively be separately specified, as in the above examples.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method comprising:
receiving, by a computing device, source code for compiling into executable processor instructions;
receiving an aspect, the aspect comprising an advice and a pointcut, the advice including bytecode for collecting execution information of the executable processor instructions at run time, the pointcut specifying a location in the executable processor instructions to insert advice executable code generated from the advice;
receiving an advice switch, the advice switch including bytecode of a conditional statement associated with a parameter and specifying that the advice executable code is to be invoked only if a condition specified by the parameter is satisfied;
generating the executable processor instructions by weaving the source code, the aspect, and the advice switch together, wherein the weaving includes looping recursively through bytecode of each routine in the source code, each loop comprising:
receiving a bytecode pointer pointing to a beginning or an end of a routine in the source code;
determining that a current execution point corresponding to the beginning of the routine or the end of the routine corresponds to a point of execution defined by the pointcut;
in respond to the determining, appending the bytecode of the advice and the bytecode of the advice switch to the bytecode of the routine at the current execution point and
translating the appended bytecode into machine executable code, wherein the bytecode of the advice switch is translated into advice-switching code, and the bytecode of the advice is translated into advice executable code, the advice-switching code operable to invoke the advice executable code upon determining, by the advice-switching code and at the run time, that the condition is satisfied; and
storing the executable processor instructions in a non-transitory storage device.

2. The method of claim 1 wherein the source code is initially compiled from first code of a programming language; and
wherein the aspect is separately initially compiled into from second intermediate code of the programming language.

3. The method of claim 2 wherein the advice switch returns a Boolean value and is placed in conditional code in the advice executable code that controls whether or not the advice executable code following the conditional code is executed.

4. The method of claim 2, wherein the computing device includes an interface that allows, during execution of the executable processor instructions, a value of the parameter as stored in an electronic memory to be altered.

5. The method of claim 2, wherein, the parameter includes a threshold value and a maximum value, and the conditional statement specifies that the advice will be invoked upon determining, by the advice-switching code and during the run time, that a pseudorandom number generated by the advice-switching code has a value that is between the threshold value and the maximum value.

6. The method of claim 2 wherein the switch includes a reference to a routine that provides a Boolean value to the conditional statement during an invocation of the advice and determines, based on the Boolean value, whether the advice will be executed.

7. A system comprising:
one or more processors;
one or more memories; and
a virtual machine stored in the one or more memories configured to cause the one or more processors to perform actions of compiling source code into executable processor instructions, the compiling comprising:
  receiving an aspect, the aspect comprising an advice and a pointcut, the advice including bytecode for collecting execution information of the executable processor instructions at run time, the pointcut specifying a location in the executable processor instructions to insert advice executable code generated from the advice;
  receiving an advice switch, the advice switch including bytecode of a conditional statement associated with a parameter and specifying that the advice executable code is to be invoked only if a condition specified by the parameter is satisfied;
  generating the executable processor instructions by weaving the source code, the aspect, and the advice switch together, wherein the weaving includes looping recursively through bytecode of each routine in the source code, each loop comprising:
    receiving a bytecode pointer pointing to a beginning or an end of a routine in the source code;
    determining that a current execution point corresponding to the beginning of the routine or the end of the routine corresponds to a point of execution defined by the pointcut;
    in respond to the determining, appending the bytecode of the advice and the bytecode of the advice switch to the bytecode of the routine at the current execution point; and
    translating the appended bytecode into machine executable code, wherein the bytecode of the advice switch is translated into advice-switching code, and the bytecode of the advice is translated into advice executable code, the advice-switching code operable to invoke the advice executable code upon determining, by the advice-switching code and at the run time, that the condition is satisfied; and
  storing the executable processor instructions in the one or more memories.

8. The system of claim 1 wherein the parameter is a value of a Boolean type, and the system comprises an interface for accepting a user input for changing the parameter to enable or disable execution of the advice executable code at run time.

9. The system of claim 1 wherein the advice switch includes a reference to a routine that provides a Boolean value to the conditional statement during an invocation of the advice and determines, based on the Boolean value, whether the advice will be executed.

10. The system of claim 1 wherein advice switch includes in-line code.

11. The system of claim 1, wherein the conditional statement is associated with an identifier, the identifier being recorded in an aspect strategy object that is configured to identify which advice switch routine to execute and which advice to invoke during run time.

12. The system of claim 1, wherein the parameter includes a threshold value and a maximum value, and the conditional statement specifies that the advice will be invoked upon determining, by the advice-switching code and during the run time, that a pseudorandom number generated by the advice-switching code has a value that is between the threshold value and the maximum value.

13. The system of claim 12, wherein the source code is initially compiled from first code of a programming language; and
  wherein the aspect is separately initially compiled from second code of the programming language.

14. The system of claim 1, wherein the advice switch returns a Boolean value to indicate whether or not the advice code containing the advice switch is to be executed.

15. A non-transitory memory device storing instructions operable to cause a computer including one or more processors to perform operations of compiling source code into executable processor instructions, the operations comprising:
  receiving an aspect, the aspect comprising an advice and a pointcut, the advice including bytecode for collecting execution information of the executable processor instructions at run time, the pointcut specifying a location in the executable processor instructions to insert advice executable code generated from the advice;
  receiving an advice switch, the advice switch including bytecode of a conditional statement associated with a parameter and specifying that the advice executable code is to be invoked only if a condition specified by the parameter is satisfied;
  generating executable processor instructions by weaving source code, the aspect, and the advice switch together, wherein the weaving includes looping recursively through bytecode of each routine in the source code, each loop comprising:
    receiving a bytecode pointer pointing to a beginning or an end of a routine in the source code;
    determining that a current execution point corresponding to the beginning of the routine or the end of the routine corresponds to a point of execution defined by the pointcut;
    in respond to the determining, appending the bytecode of the advice and the bytecode of the advice switch to the bytecode of the routine at the current execution point; and
  translating the appended bytecode into machine executable code, wherein the bytecode of the advice switch is translated into advice-switching code, and the bytecode of the advice is translated into advice executable code, the advice-switching code operable to invoke the advice executable code upon determining, by the advice-switching code and at the run time, that the condition is satisfied; and
  storing the executable processor instructions in the non-transitory memory device.

16. The method of claim 2 wherein the parameter is a value of a Boolean type, and the computing device comprises an interface for accepting a user input for changing the parameter to enable or disable execution of the advice executable code at run time.

17. The non-transitory memory device of claim 15 wherein the parameter includes a threshold value and a maximum value, and the conditional statement specifies that the advice will be invoked upon determining, by the advice-switching code and during the run time, that a pseudorandom number generated by the advice-switching code has a value that is between the threshold value and the maximum value.

18. The non-transitory memory device of claim 15 wherein the source code is initially compiled from first code of a programming language; and
  wherein the aspect is separately initially compiled from second code of the programming language.

* * * * *

UNITED STATES PATENT AND TRADEMARK OFFICE
CERTIFICATE OF CORRECTION

PATENT NO. : 8,997,042 B2
APPLICATION NO. : 13/652351
DATED : March 31, 2015
INVENTOR(S) : John Victor Kew and Jonathan Travis Page 1 of 1

It is certified that error appears in the above-identified patent and that said Letters Patent is hereby corrected as shown below:

On the title page under item (56), Column 2 (Other Publications), line 1: Delete "Architecutre" and insert --Architecture--;

In the claims,

In Claim 1, Column 14, line 26: Delete "point" and insert --point;--;

In Claim 8, Column 15, line 41: Delete "claim 1" and insert --claim 7--;

In Claim 9, Column 15, line 45: Delete "claim 1" and insert --claim 7--;

In Claim 10, Column 15, line 50: Delete "claim 1" and insert --claim 7--;

In Claim 11, Column 15, line 52: Delete "claim 1" and insert --claim 7--;

In Claim 12, Column 15, line 57: Delete "claim 1" and insert --claim 7--; and

In Claim 14, Column 16, line 3: Delete "claim 1" and insert --claim 7--.

Signed and Sealed this
Twentieth Day of October, 2015

Michelle K. Lee
*Director of the United States Patent and Trademark Office*